July 10, 1951 F. A. BARR 2,560,382
DRILL JIG
Filed Jan. 17, 1947 4 Sheets-Sheet 1
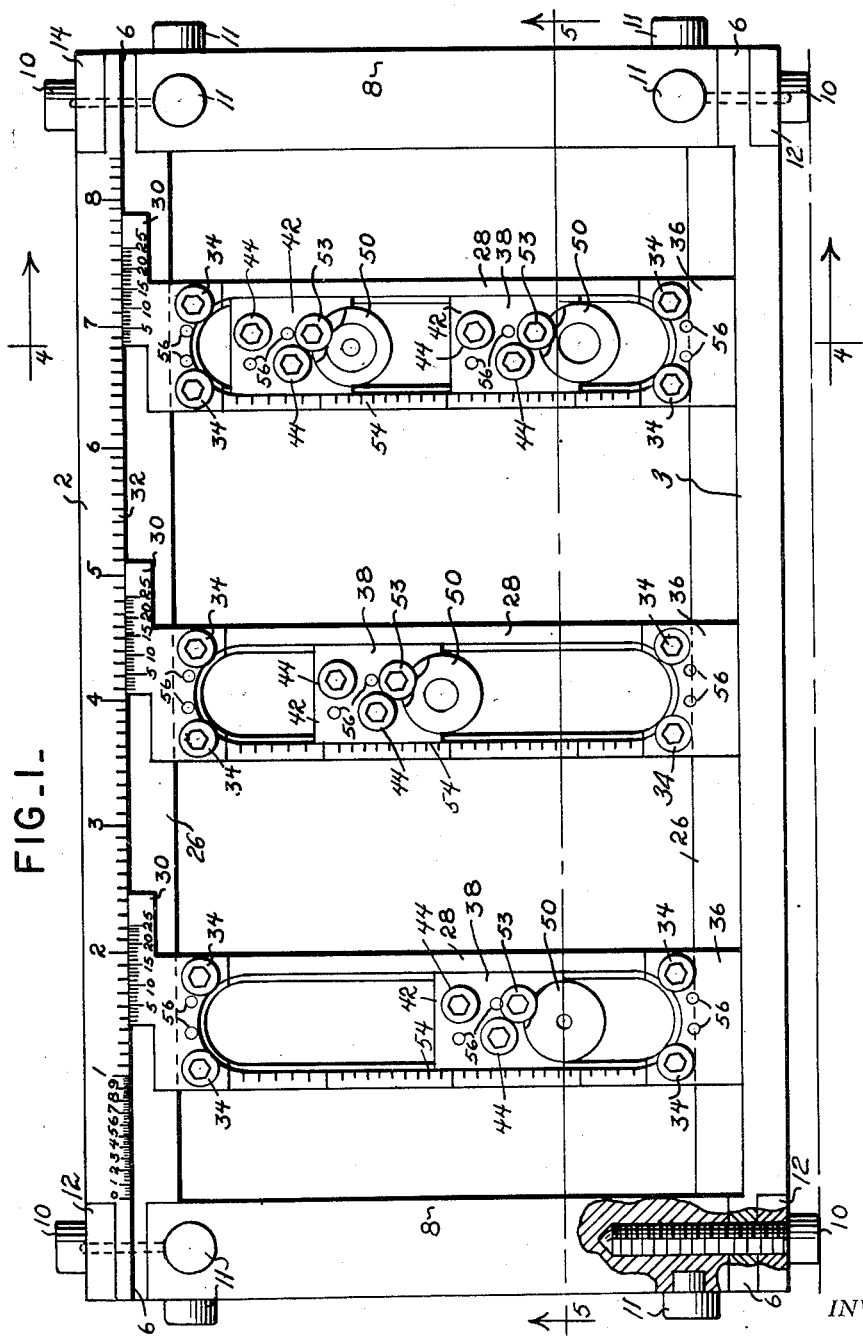
INVENTOR.
FRANCIS A. BARR
BY *Victor J. Evans & Co.*
ATTORNEYS July 10, 1951  F. A. BARR  2,560,382
DRILL JIG
Filed Jan. 17, 1947  4 Sheets-Sheet 2
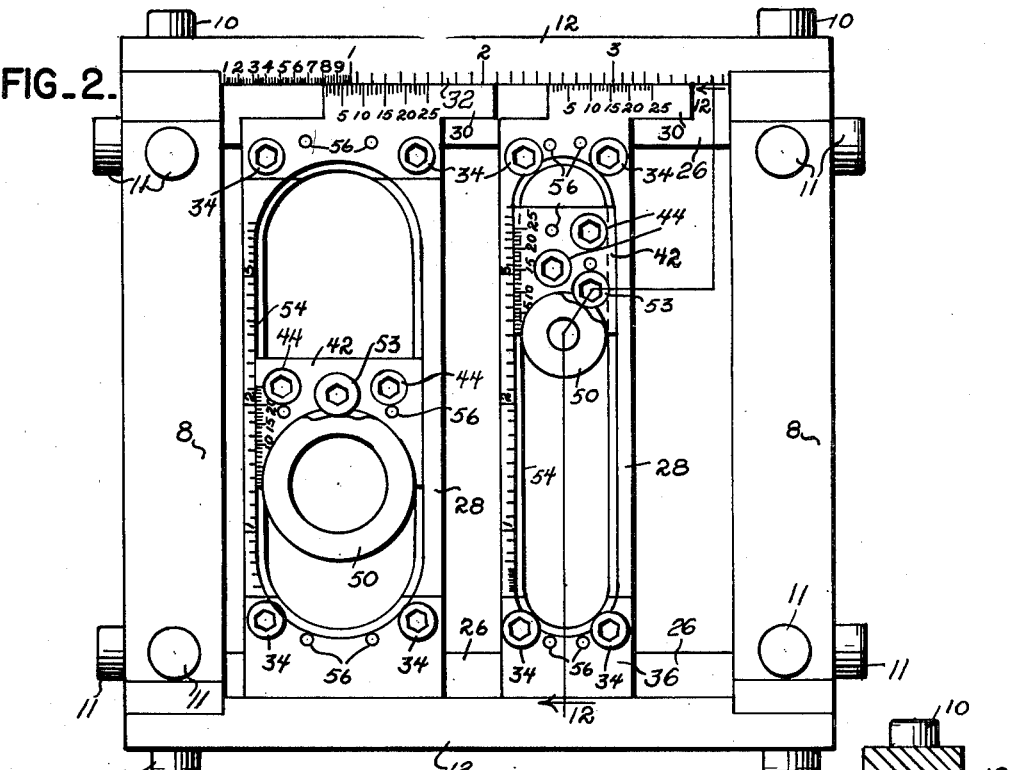
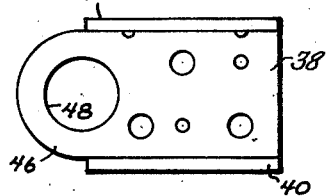
FIG_6_
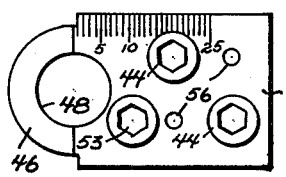
FIG_7_
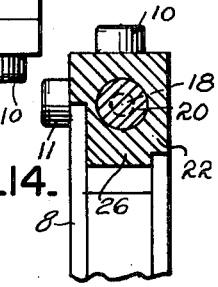
FIG_14_
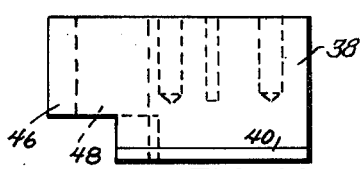
FIG_8_
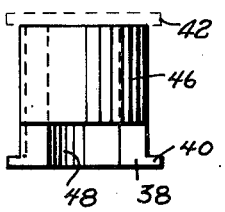
FIG_9_
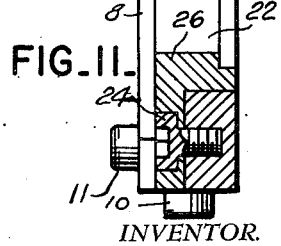
FIG_11_
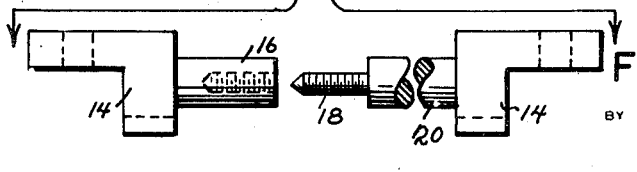
FIG_10_
INVENTOR.
FRANCIS A. BARR
BY Victor J. Evans & Co.
ATTORNEYS July 10, 1951 — F. A. BARR — 2,560,382
DRILL JIG
Filed Jan. 17, 1947 — 4 Sheets-Sheet 3

INVENTOR.
FRANCIS A. BARR
BY Victor J. Evans & Co.
ATTORNEYS

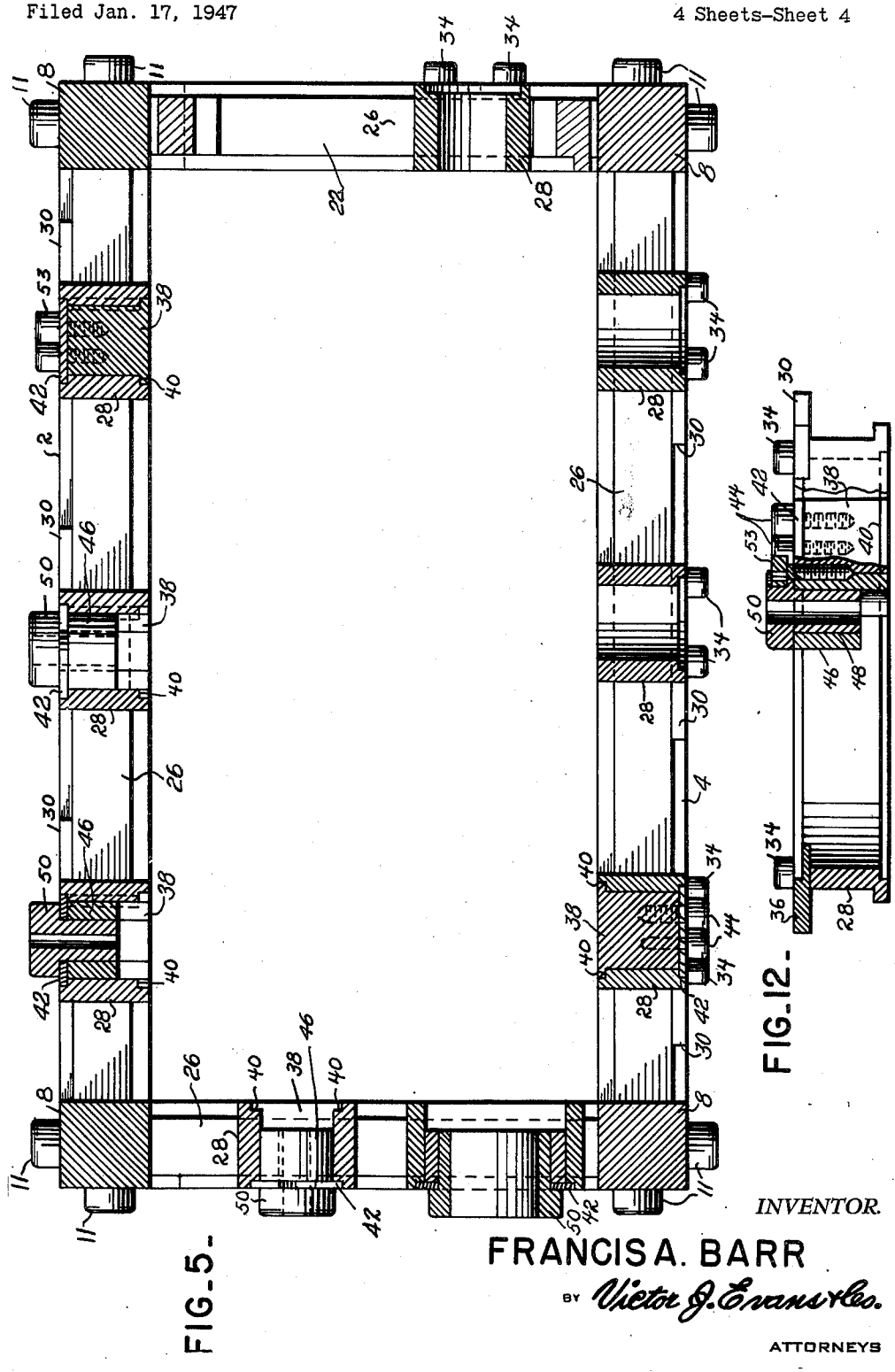

Patented July 10, 1951

2,560,382

UNITED STATES PATENT OFFICE 2,560,382

DRILL JIG

Francis A. Barr, Laurelton, N. Y.

Application January 17, 1947, Serial No. 722,489

4 Claims. (Cl. 77—62)

My present invention relates to an improved drill jig and more particularly to a device comprising an open frame in which the work to be drilled may be securely positioned, and including movable drill guides slidable vertically and longitudinally of the frame so that the location of the point of the holes to be drilled may be determined with accuracy and facility.

The purpose of this invention is to provide a box-like open frame with longitudinally extended bars at the sides connected by vertically disposed posts and transversely disposed bars at the ends and with drill guides positioned in the sides and ends for vertical and horizontal adjustment wherein work pieces may be placed in the jig through a gate in one end and positioned to correspond with the drill guides.

The object of the invention is, therefore, to provide an open box-like drill jig in which a number of pieces of work of the same description may be drilled one after the other without resetting the drill guides.

Another object of the invention is to provide a drill jig for re-boring holes in work parts to facilitate repair and replacement of parts without resetting the drill for each part.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 1 is a side elevational view of the jig of my invention.

Figure 2 is an end elevational view.

Figure 5 is a sectional view at line 5—5 of Figure 1.

Figures 3, 4, 13:
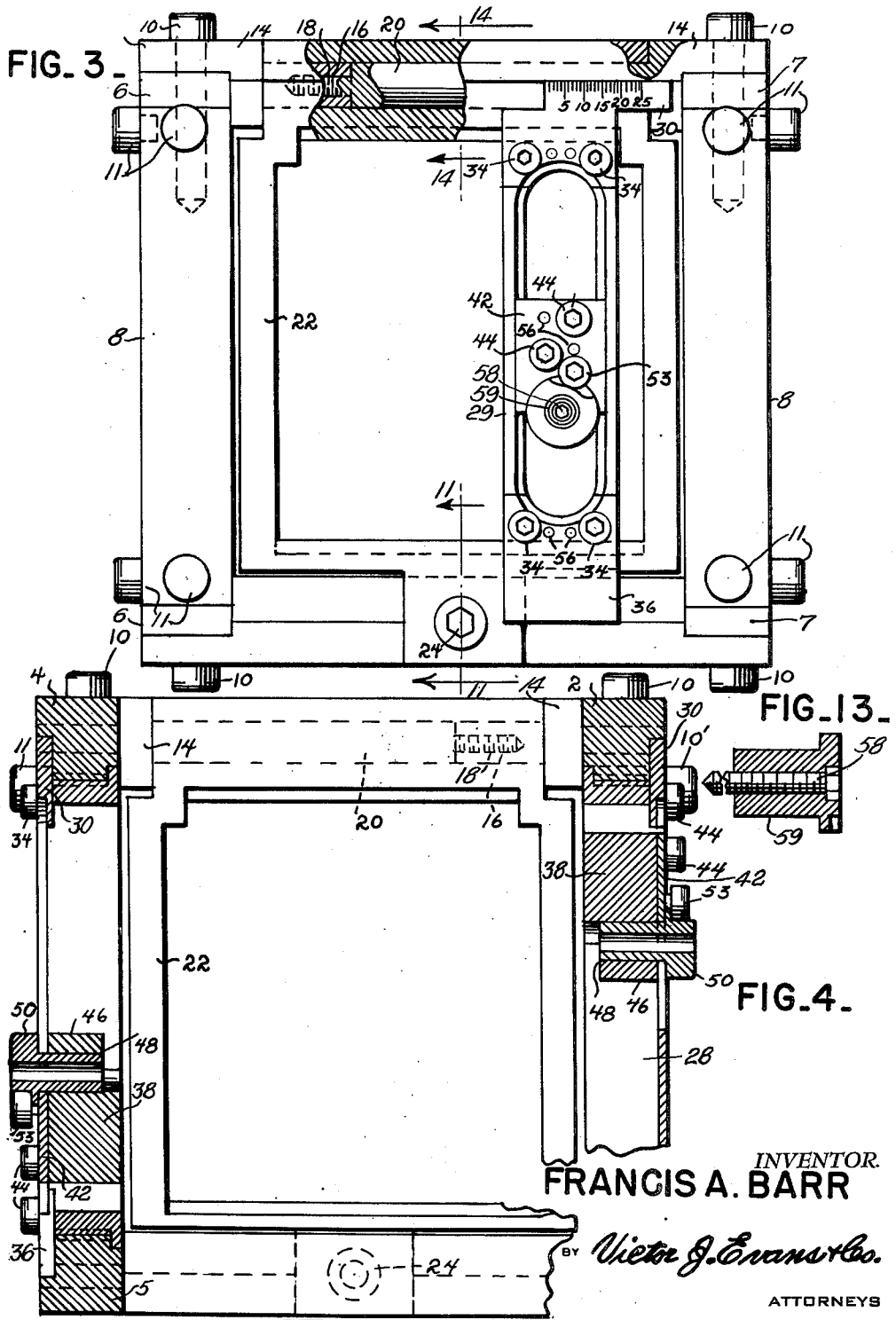
Figure 3 is an end elevational view of the other end showing the gate therein.
Figure 4 is a sectional view at line 4—4 of Figure 1.

Figures 6, 7, 8, and 9 are views of the slides.

Figure 10 is a plan view of the pivot for the gate.

Figure 11 is a sectional view at line 11—11 of Figure 3.

Figure 12 is a sectional view at line 12—12 of Figure 2.

Figure 13 is a longitudinal section through an anchor screw mounting showing a screw for clamping work against the closed end of the frame threaded in a bushing adapted to be used in the bore of one of the drill guide bushings.

Figure 14 is a detail showing a section on line 14—14 of Figure 3 illustrating the pivotal mounting of the gate in the end of the frame.

Referring now to the drawings wherein I have illustrated the present preferred embodiment of my invention I employ a frame comprising horizontally-positioned longitudinally disposed bars 2 and 3 at the front and 4 and 5 at the rear and the ends of the bars are provided with tongues 6 for connection with vertical posts 8. Socket head screws 10 are used to secure the arms and posts together, and bosses 11 are fixed to the bars by inserting them while cold and allowing them to expand when exposed to normal temperatures. The bars are connected at one end of the frame and at the lower part of the opposite end by bars 12, while the upper part of the said opposite end is provided with brackets 14, one of which has a bored shaft 16 to secure the threaded end 18 of the shaft 20, forming a pin or axle. A rectangular frame or gate 22 is pivotally mounted on this axle and a socket head screw 24 releasably secures the frame or gate in closed position.

The bars 2, 3, 4 and 5, the bars 12 and also the frame 22 are ribbed at 26 to guide and secure slidably thereon the slides 28 substantially rectangular in shape and formed with open centers. Similar slides 29 are provided for the end of the frame in which the gate is positioned and shoulders on the inner surfaces of the slides 29 are spaced from the lower ends to provide clearance for the bar forming the lower end of the gate. Upper scales 30 on these slides co-act with scales 32 on the upper frame connections, the scales 30 being offset from the longitudinal center of the openings to measure laterally from that line. The scales 30 are removably attached by screws 34, as are the lower plates 36.

Slidable within the open centers of the slides, are the guides 38 formed with flanges 40 co-acting with the removable scale plates 42 to secure the guides on the slides. Screws 44 secure the plates 42 to the body of the guides and at one end of the body of each slide I provide a boss 46 having a bore 48 into which may be located a bushing 50 secured by screw 53. The bore of the bushing selected will conform to the diameter of the drill to be used therethrough, and the center of the bushing bore may be located by using the scale of the plate 42 in conjunction with the scale 54 of the slides 28.

The various scales are calibrated to .025 inch and thus the guides and slides may be accurately adjusted to locate the center of the holes to be drilled.

Dowel pins 56 may be inserted in provided holes in the guides and slides to insure their accurate positioning, and after the guides and slides are moved to the selected position, the screws 34 and 44 are tightened thereby securely positioning the bore centrally of the proposed drilling operation.

The work entering the frame through the opened gate is placed firmly against the closed end and with the gate secured, the socket head screw 58 which is threaded in a bushing 59, similar to one of the bushings 50 and secured in one of the bores 48 in a similar manner where it is held by one of the screws 53 is screwed inwardly against the work to secure the work in place in the frame.

The guides and slides are then positioned and the jib is ready for drilling.

Having thus fully described my invention what I claim as new and desire to secure by Letters Patent is:

1. In a drill jig, the combination which comprises a box-like frame having parallel longitudinally disposed upper and lower front and rear side bars connected at the ends with transversely disposed end bars, vertically disposed posts at the corners of the frame connecting the said side and end bars, a gate pivotally mounted in one end of the frame, means locking the gate in a closed position, drill guide mounting slides having elongated slotted openings therein slidably mounted in the side and end bars of the frame, drill guide scale plates slidably mounted in the elongated openings of the drill guide mounting slides whereby with the drill guide mounting slides horizontally movable and the scale plates movable vertically the guides are positioned to register with work pieces positioned in the frame so that a plurality of work pieces may be drilled with one setting of the parts, and means removably mounting drill guides in the said scale plates, said bars and drill guide slides having graduations and scales thereon.

2. In a drill jig, the combination which comprises a box-like frame having parallel longitudinally disposed upper and lower front and rear side bars connected at the ends with transversely disposed end bars, vertically disposed posts at the corners of the frame connecting the said side and end bars, a gate pivotally mounted in one end of the frame, means locking the gate in closed position, drill guide mounting slides having elongated slotted openings therein slidably mounted in the side and end bars of the frame, drill guide scale plates slidably mounted in the elongated openings of the drill guide mounting slides whereby with the drill guide mounting slides horizontally movable and the scale plates movable vertically the guides are positioned to register with work pieces positioned in the frame so that a plurality of work pieces may be drilled with one setting of the parts, means removably mounting drill guides in the said scale plates, said bars and drill guide slides having graduations and scales thereon, and clamping means securing the drill guide mounting slides and scale plates in selected positions.

3. In a drill jig, the combination which comprises a box-like frame having parallel longitudinally disposed upper and lower front and rear side bars connected at the ends with transversely disposed end bars, vertically disposed posts at the corners of the frame connecting the said side and end bars, a gate pivotally mounted in one end of the frame, means locking the gate in a closed position, drill guide mounting slides having elongated slotted openings therein slidably mounted in the side and end bars of the frame, drill guide scale plates slidably mounted in the elongated openings of the drill guide mounting slides whereby with the drill guide mounting slides horizontally movable and the scale plates movable vertically the guides are positioned to register with work pieces positioned in the frame so that a plurality of work pieces may be drilled with one setting of the parts, means removably mounting drill guides in the said scale plates, said bars and drill guide slides having graduations and scales thereon, and means mounting the drill guides in the scale plates whereby the guides are interchangeable.

4. In a drill jig, the combination which comprises a box-like frame having parallel longitudinally disposed upper and lower front and rear side bars connected at the end with transversely disposed end bars and said bars having tongues on the opposed inner surfaces, posts at the corners of the frame connecting the said parallel bars, drill guide mounting slides having elongated openings therein with parallel rails at the sides and with tongues on the inner opposed faces of the rails, drill guide scale plates having drill receiving bushings therein slidably mounted in the drill guide mounting slides whereby with the drill guide scale plates and bushings adjustable vertically and the drill guide slides adjustable horizontally the drill guide bushings are accurately adjustable both vertically and horizontally so that a plurality of holes may be drilled into the sides and ends of a piece of work without changing the position of the work piece in the drill jig, means clamping the drill guide mounting slides in the frame and means clamping the drill guide scale plates in the slides.

FRANCIS A. BARR.

REFERENCES CITED

The following references are of record in the file of this patent:

UNITED STATES PATENTS

| Number | Name | Date |
| --- | --- | --- |
| 1,018,153 | Bank | Feb. 20, 1912 |
| 1,269,811 | Heritage | June 18, 1918 |
| 1,335,347 | Moulds | Mar. 30, 1920 |
| 1,601,645 | Ratcliffe | Sept. 28, 1926 |
| 2,083,490 | Baker | July 31, 1935 |
| 2,341,107 | MacDonald | Feb. 8, 1944 |
| 2,389,243 | Tillett | Nov. 20, 1945 |
| 2,422,114 | Matter | June 10, 1947 |

OTHER REFERENCES

American Machinist, August 24, 1938, page 773.